US007328175B2

(12) United States Patent
Onodera et al.

(10) Patent No.: US 7,328,175 B2
(45) Date of Patent: Feb. 5, 2008

(54) METHOD AND APPARATUS FOR TRANSACTION BROKERAGE AND PROGRAM RECORDING MEDIUM THEREOF

(75) Inventors: Sachiko Onodera, Kawasaki (JP); Ryo Ochitani, Kawasaki (JP); Isao Namba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 569 days.

(21) Appl. No.: 10/864,336

(22) Filed: Jun. 10, 2004

(65) Prior Publication Data

US 2004/0225600 A1 Nov. 11, 2004

Related U.S. Application Data

(63) Continuation of application No. PCT/JP01/10849, filed on Dec. 11, 2001.

(51) Int. Cl.
G06Q 30/00 (2006.01)
G06F 17/30 (2006.01)
(52) U.S. Cl. .......................................... 705/26; 705/27
(58) Field of Classification Search .................. 705/26, 705/27
See application file for complete search history.

(56) References Cited

U.S. PATENT DOCUMENTS

| 5,794,207 | A | * | 8/1998 | Walker et al. ................. 705/1 |
| 5,842,178 | A | * | 11/1998 | Giovannoli ................... 705/26 |
| 6,587,838 | B1 | * | 7/2003 | Esposito et al. .............. 705/26 |
| 7,082,409 | B1 | * | 7/2006 | Cherry ......................... 705/26 |
| 2001/0049636 | A1 | * | 12/2001 | Hudda et al. ................. 705/26 |
| 2002/0116287 | A1 | * | 8/2002 | Schubert et al. ............. 705/26 |
| 2004/0015403 | A1 | * | 1/2004 | Moskowitz et al. .......... 705/26 |

FOREIGN PATENT DOCUMENTS

| JP | 11-7468 | | 1/1999 |
| JP | 2000-259995 | | 9/2000 |
| JP | 2000-339593 | | 12/2000 |
| JP | 2001175768 A | * | 6/2001 |

(Continued)

OTHER PUBLICATIONS

Author unknown, "Digital Rum: Digital Rum And Webraska Collaborate To Deliver Proximity Shipping Services To Mobile Operators; New Applications Will Allow Customers To Pinpoint High Street Deals Via Mobile Phones," M2 Presswire, Coventry, Apr. 20, 2001. p. 1.*

(Continued)

Primary Examiner—Yogesh C. Garg
Assistant Examiner—Amee A. Shah
(74) Attorney, Agent, or Firm—Staas & Halsey LLP

(57) ABSTRACT

A transaction brokerage method and system brokering a transaction between an information transmitting terminal and an information receiving terminal, including registering a plurality of the information receiving terminals in advance; receiving a transaction request transmitted from the information transmitting terminal, the transaction request including the expiration time of the transaction request; and selecting one or more of the registered information receiving terminals within a predetermined range as the recipients of the transaction request and transmitting the transaction request. Transaction acceptances received within the expiration time included in the transaction request are validated and transmitted to the information transmitting terminal and a transaction possible or impossible indication is transmitted to the information receiving terminals.

8 Claims, 9 Drawing Sheets

FOREIGN PATENT DOCUMENTS

| | | |
|---|---|---|
| JP | 2001-195451 | 7/2001 |
| JP | 2001-216401 | 8/2001 |
| JP | 2001-243406 | 9/2001 |
| JP | 2001-250037 | 9/2001 |
| JP | 2001-306716 | 11/2001 |
| JP | 2001-338171 | 12/2001 |

OTHER PUBLICATIONS

Komura Tetsuo, Patent Abstracts of Japan, "Real Estate Information Management System and Its Method", Publication No. 11-007468 and Publication Date: Jan. 12, 1999.

Oyama Mitsuru, Patent Abstracts of Japan, Radio Communication System, Publication No. 2001-216401, Publication Date: Aug. 10, 2001.

Tanaka Katsumi, Patent Abstracts of Japan, "System, Method, and Server For Electronic Transaction, and Method for Supporting Electronic Transaction", Publication No. 2001-243406, Publication Date: Sep. 7, 2001.

Suzuki Tetsuya et al., Patent Abstracts of Japan, "System and Method for Electronic Mediation", Publication No. 2001-250037, Publication Date: Sep. 14, 2001.

Ito Yasuo et al., Patent Abstracts of Japan, "Mediation System For Commercial Transaction With Store Guide, Store Retrieving Device and Route Data Transmitter", Publication No. 2001-306716, Publication Date: Nov. 2, 2001.

Japanese Office Action dated Feb. 21, 2007 for corresponding Japanese Patent Application 2003-551721.

* cited by examiner

FIG. 3

INDIVIDUAL INFORMATION

| USER NAME OF INFORMATION RECEIVING TERMINAL | PERSONAL INFORMATION | | | PROFILE INFORMATION | | | | | | RECEIVING DENIAL FLAG | RECEIVING DENIAL EXPIRATION TIME | RECEIVING DENIAL CONDITION |
|---|---|---|---|---|---|---|---|---|---|---|---|---|
| | PHONE NUMBER | E-MAIL ADDRESS | STREET ADDRESS | AGE | SEX | HOBBY | ... | TIME INFORMATION | POSITION INFORMATION | | | |
| ... | | | | | | | | | | | | |

| USER NAME OF INFORMATION TRANSMITTING TERMINAL | PERSONAL INFORMATION | | | PROFILE INFORMATION | | | | | |
|---|---|---|---|---|---|---|---|---|---|
| | PHONE NUMBER | E-MAIL ADDRESS | STREET ADDRESS | AGE | SEX | HOBBY | ... | TIME INFORMATION | POSITION INFORMATION |
| ... | | | | | | | | | |

FIG. 4A

- INFORMATION TRANSMITTING TERMINAL INFORMATION
- DESCRIPTION OF TRANSACTION REQUEST
- TRANSACTION EXPIRATION TIME

- CONDITION FOR RECEIVING TRANSACTION REQUEST
- PERMISSION FOR DISCLOSURE OF INDIVIDUAL INFORMATION
- REQUEST FOR DISCLOSURE OF INDIVIDUAL INFORMATION
- REQUEST FOR DISCLOSURE OF INDIVIDUAL-INFORMATION AS PREREQUISITE
- UPPER LIMIT OF NUMBER OF INFORMATION RECEIVING TERMINALS

FIG. 4B

- TRANSACTION REQUEST ID
- DESCRIPTION OF TRANSACTION REQUEST
- TRANSACTION EXPIRATION TIME

- INFORMATION TERMINAL INDIVIDUAL INFORMATION
- REQUEST FOR DISCLOSURE OF INDIVIDUAL INFORMATION
- INDIVIDUAL-INFORMATION-DISCLOSURE-REQUIRING REQUEST

FIG. 4C

- TRANSACTION REQUEST ID
- TRANSACTION ACCEPTANCE EXPIRATION TIME

- PERMISSION FOR DISCLOSURE OF INDIVIDUAL INFORMATION

FIG. 4D

- TRANSACTION REQUEST ID
- TRANSACTION ACCEPTANCE ID
- TRANSACTION ACCEPTANCE EXPIRATION TIME

- INFORMATION TERMINAL INDIVIDUAL INFORMATION

FIG. 4E

- TRANSACTION REQUEST ID
- TRANSACTION ACCEPTANCE ID
- TRANSACTION POSSIBLE/IMPOSSIBLE

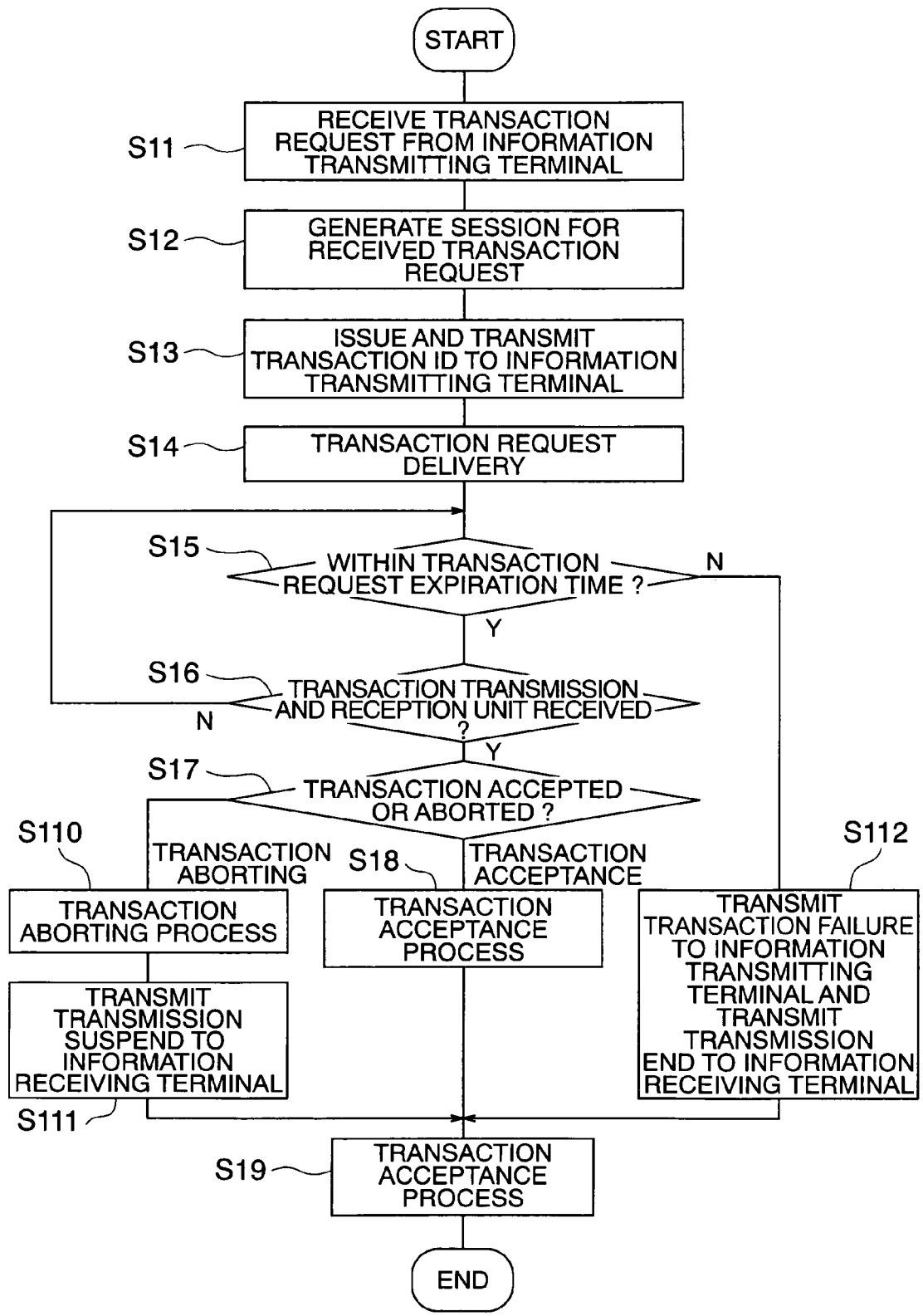

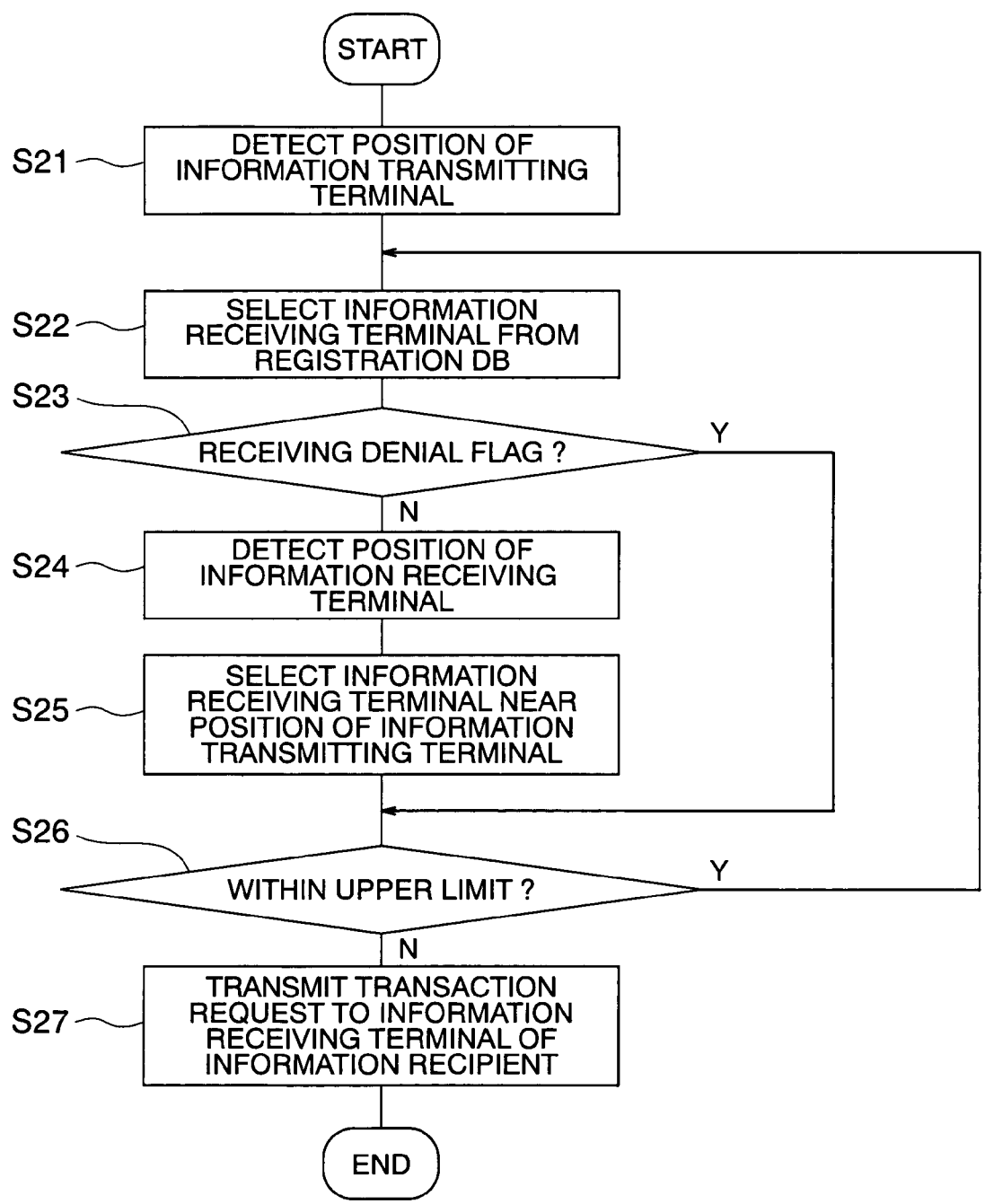

METHOD AND APPARATUS FOR TRANSACTION BROKERAGE AND PROGRAM RECORDING MEDIUM THEREOF

CROSS REFERENCE TO RELATED APPLICATIONS

This is a continuation application of PCT application serial number PCT/JP01/10849, filed on Dec. 11, 2001.

BACKGROUND OF THE INVENTION

1. Field of the Invention

The present invention relates to a method and apparatus for transaction brokerage and a program recording medium thereof, and more particularly to a method and apparatus for transaction brokerage and a program recording medium thereof in which both of goods or service providers and customers become an information transmitters and the information transmitters select a party they conduct the transaction, in transaction brokerage between the providers and customers.

2. Description of the Related Art

As the Internet is widely used now, providers of services or goods (hereinafter referred to as "service providers") are delivering information such as advertisements to consumers through Web pages or e-mail. In this case, recipients of the information are selected from customer profile information, purchase histories or activity histories of customers by using methods such as data mining. However, when service providers want to provide information of services or goods (or commodities) which they will be provide in a physically limited area and in a short time period, such recipient selection method as described above does not help the service providers to effectively target consumers.

On the other hand, when a consumer who requests a service from a service provider wants to obtain the service as soon as possible, it is desirable that the consumer selects the service provider which can provide the service in the shortest possible time, namely, the service provider nearest to the consumer, and ask for the service. At present, however, it is difficult for consumers to make such selection. For example, when the service is taxi transportation, a consumer can easily check out the location of a taxi company but cannot know the current positions of their taxis. Furthermore, when a consumer directly accesses a provider, the consumer's personal information may be brought to the knowledge of the provider before a transaction is settled. Then, the consumer can be placed at some disadvantage after the transaction fails to close. On the contrary, a provider who receives requests for services from consumers also cannot know a consumer wanting their service is in the proximity of the provider. Then, the provider misses the business opportunity.

It is an object of the present invention to provide a transaction brokerage method in which a transmitter of information selects a recipient and transmit the information to the selected recipient.

It is another object of the present invention to provide a transaction brokerage apparatus in which a transmitter of information selects a recipient and transmit the information to the selected recipient.

It is still another object of the present invention to provide a transaction brokerage program in which a transmitter of information selects a recipient and transmit the information to the selected recipient.

It is further object of the present invention to provide a recording medium including a transaction brokerage program in which a transmitter of information selects a recipient and transmit the information to the selected recipient.

SUMMARY OF THE INVENTION

A transaction brokerage method of the present invention is a method for brokering a transaction between an information transmitting terminal and information receiving terminal connected through a transaction brokerage apparatus. The method includes: registering a plurality of the information receiving terminals in advance; receiving a transaction request transmitted from the information transmitting terminal, the transaction request including expiration time of the transaction request; selecting one or more of the information receiving terminals which are within a predetermined range from the information transmitting terminal from the registered information receiving terminals as one or more recipients of the transaction request, and transmitting the transaction request to the selected one or more information receiving terminals; receiving transaction acceptances from the information receiving terminals; regarding one or more of the transaction acceptances which have been received within the expiration time included in the transaction request as valid transaction acceptances, and transmitting only the valid transaction acceptances to the information transmitting terminal; receiving a transaction possible or impossible indication from the information transmitting terminal; and transmitting the transaction possible or impossible indication to the information receiving terminals.

A transaction brokerage apparatus of the present invention is an apparatus for brokering a transaction between an information transmitting terminal and information receiving terminal. The apparatus includes: a transaction transmission and reception unit to receive a transaction request including expiration time of the transaction request from the information transmitting terminal, transmit the transaction request to the information receiving terminal, receive a transaction acceptance including expiration time of the transaction acceptance from the information receiving terminal, transmit the transaction acceptance to the information transmitting terminal, and receive a transaction possible or impossible indication from the information transmitting terminal; a terminal registration database to register a plurality of the information receiving terminals and individual information of the information receiving terminals; a position information detecting unit to obtain position information of the information transmitting terminals and information receiving terminals; a recipient selection unit to select one or more of the information receiving terminals registered in the terminal registration database as one or more of recipient of the transaction request, and select one or more of the selected information receiving terminals based on the position information of the information transmitting terminal and information receiving terminals; and a transaction management unit to control the transaction transmission and receiving unit to transmit the transaction request to the information receiving terminals selected by the recipient selecting unit, regard transaction acceptances received within the expiration time of the transaction request as valid transaction acceptances, transmit only the valid transaction acceptances to the information transmitting terminal, regard transaction possible or impossible indications received within the expiration time of the transaction acceptance as valid transaction possible or impossible indications, and transmit only the valid transaction possible or impossible indications to the transaction information receiving terminals.

According to the transaction brokerage method and apparatus of the present invention, the user of an information transmitting terminal can select, as a party with whom the user conducts a transaction, the user of an information receiving terminal which is within a specified range from the information transmitting terminal and from which the information transmitting terminal can receive a transaction acceptance within the expiration time specified in the transaction request. Thus, a service or goods provider as the information transmitter can deliver information of services or goods which the provider provides in a physically limited area in a relatively short time period to target consumers selected effectively. On the contrary, a consumer as the information transmitter can select the service provider which can provide a service in the shortest possible time, namely, the service provider nearest to the consumer, and can ask for the service.

A transaction brokerage program of the present invention is for realizing a transaction brokerage apparatus for brokering a transaction between an information transmitting terminal and information receiving terminal. The program causes a computer to execute: registering a plurality of the information receiving terminals in advance; receiving a transaction request transmitted from the information transmitting terminal, the transaction request including expiration time of the transaction request; selecting one or more of the information receiving terminals which are within a predetermined range from the information transmitting terminal as one or more of recipient of the transaction request, and transmitting the transaction request to the selected information receiving terminals; receiving transaction acceptances from the information receiving terminals; regarding one or more of the transaction acceptances which have been received within the expiration time included in the transaction request as valid transaction acceptances, and transmitting only the valid transaction acceptances to the information transmitting terminal; receiving a transaction possible or impossible indication from the information transmitting terminal; and transmitting the transaction possible or impossible indication to the information receiving terminals.

The transaction brokerage program of the present invention makes it possible to realize the transaction brokerage method and apparatus described above. Thus, a service or goods provider as the information transmitter can deliver information of services or goods which the provider provides in a physically limited area in a relatively short time period to target consumers selected effectively. A consumer as the information transmitter can select the service provider which can provide a service in the shortest possible time, namely, the service provider nearest to the consumer, and can ask for the service.

A transaction brokerage program recording medium of the present invention is a computer-readable program recording medium which records a transaction brokerage program for realizing a transaction brokerage apparatus for brokering a transaction between an information transmitting terminal and information receiving terminal. The program causes the computer to execute: registering a plurality of the information receiving terminals in advance; receiving a transaction request transmitted from the information transmitting terminal, the transaction request including expiration time of the transaction request; selecting one or more of the information receiving terminals which are within a predetermined range from the information transmitting terminal as one or more of recipient of the transaction request, and transmitting the transaction request to the selected information receiving terminals; receiving transaction acceptances from the information receiving terminals; regarding one or more of the transaction acceptances which have been received within the expiration time included in the transaction request as valid transaction acceptances, and transmitting only the valid transaction acceptances to the information transmitting terminal; receiving a transaction possible or impossible indication from the information transmitting terminal; and transmitting the transaction possible or impossible indication to the information receiving terminals.

According to the transaction brokerage program recording medium of the present invention, the program which realizes the transaction brokerage method and apparatus as described above can be recorded on a recording medium such as a CD-ROM, CDR/W, or flexible disk or the like and provided. Therefore, a service or goods provider as the information transmitter can deliver information of services or goods which the provider provides in a physically limited area in a relatively short time period to target consumers selected effectively. A consumer as the information transmitter can select the service provider which can provide a service in the shortest possible time, namely, the service provider nearest to the consumer, and can ask for the service.

BRIEF DESCRIPTION OF THE DRAWINGS

FIG. 3 shows an example of individual information.

FIG. 4 shows a data exchanged, especially FIG. 4A shows transaction request data transmitted from an information transmitting terminal, FIG. 4B shows transaction request data received by an information receiving terminal, FIG. 4C shows transaction acceptance data transmitted by the information receiving terminal, FIG. 4D shows transaction acceptance data received by the information transmitting terminal, and FIG. 4E shows transaction possible/impossible data transmitted by the information transmitting terminal.

FIGS. 5 to 7 are flowcharts of processes performed in a process flow in an transaction brokerage apparatus, especially FIG. 5 shows a transaction brokerage process flow, FIG. 6 shows a transaction request process flow, and FIG. 7 shows a transaction acceptance process.

DETAILED DESCRIPTION OF THE PREFERRED EMBODIMENTS

Figure 1:
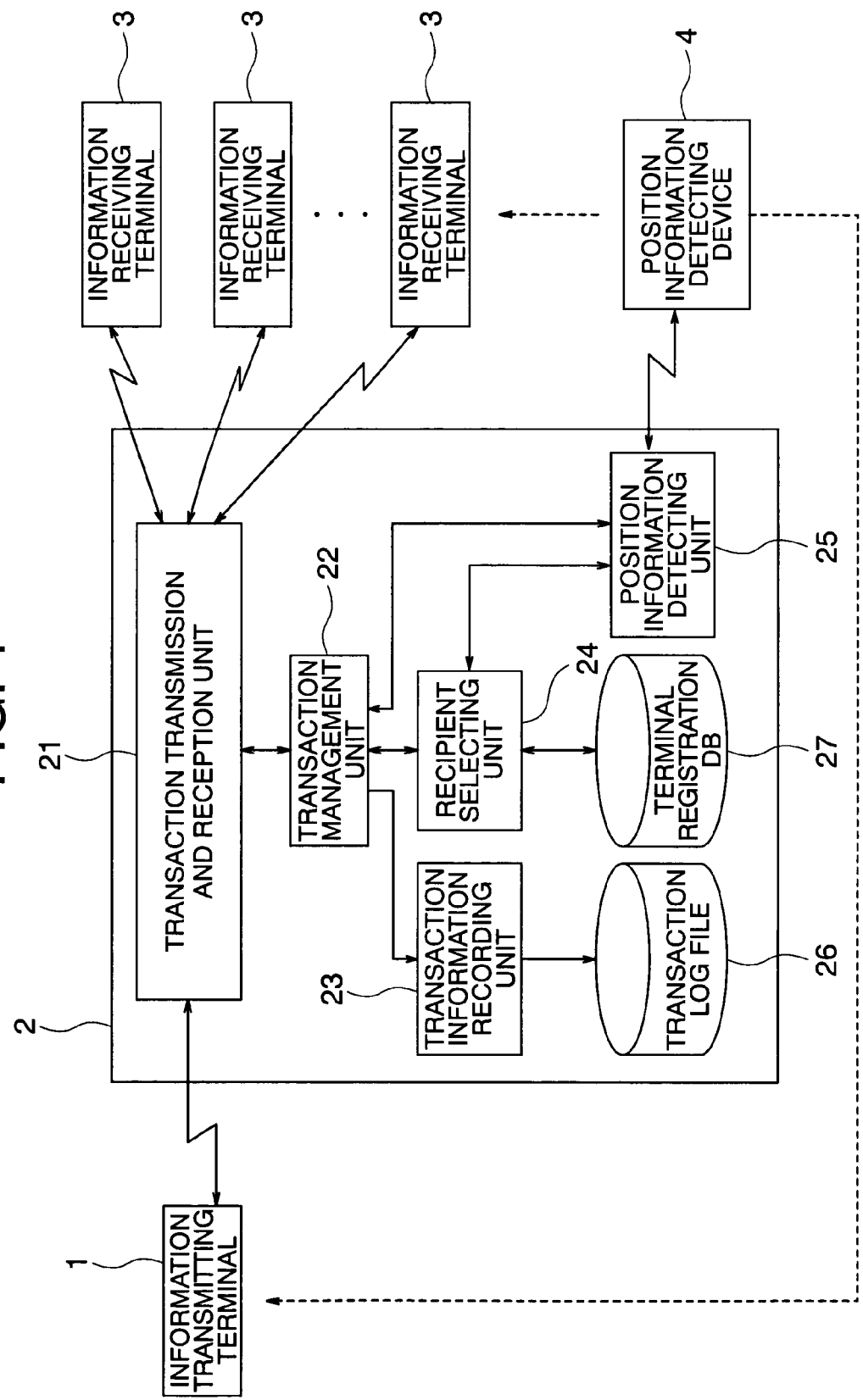
FIG. 1 is a block diagram of a transaction brokerage system according to the present invention.

FIG. 1 is a block diagram of a transaction brokerage system and shows a structure of a transaction brokerage apparatus and a transaction brokerage system for performing a transaction brokerage method of the present invention. The transaction brokerage system includes a terminal 1, a transaction brokerage apparatus 2, one or more terminals 3, and a position information detecting device (or unit) 4.

Which of the terminals 1 and 3 is used by which of a consumer and a goods or service provider is not fixed and depends on the situation. When a department store transmits a transaction request (information to notify contents of goods etc. which will be provided) to its customers (as in an example in FIG. 8, which will be described later), the department store uses terminal 1 and a customer uses terminal 3. When a taxi user transmits a transaction request (information to notify conditions for using a taxi) to a taxi (as in an example in FIG. 9, which will be described later), the taxi user uses terminal 1 and the taxi uses terminal 3. In the following description, a terminal 1 used by a party who transmits a transaction request is referred to an information transmitting terminal 1, and a terminal 3 used by a party who receives a transaction request is referred to an information receiving terminal 3, to distinguish each other.

The information transmitting terminal 1 and the information receiving terminal 3 are essentially mobile terminals or computers having a wireless data communication capability. The information transmitting terminal 1 and information receiving terminal 3 may be laptop or handheld personal computers, personal digital assistants, internet-capable portable telephones (or mobile telephones), or mobile communication devices, for example. The information transmitting terminal 1 may be a computer provided stationary, as will be described later (as in the example in FIG. 8). The transaction brokerage apparatus 2 may be a computer or server installed at a goods provider, transaction broker, telecommunications company (or relay station of portable telephone), or provider (application service provider), or the like.

The information transmitting terminal 1 transmits a transaction request to be brokered and receives a transaction acceptance to the transaction request. The information receiving terminals 3 receives the transaction request and returns (transmits) a transaction acceptance (or nonacceptance) as a response to it. The transaction brokerage apparatus 2 is located between the information transmitting terminal 1 and information receiving terminals 3, and transmits and receives a transaction request and a response to and from them to broker a transaction between them. That is, the transaction brokerage apparatus 2 receives a transaction request from the information transmitting terminal 1 and delivers it to the information receiving terminals 3. The transaction brokerage apparatus 2 receives a transaction acceptance from the transaction receiving terminals 3 and transmits it to the information transmitting terminal 1. The transaction brokerage apparatus 2 receives a transaction possible/impossible indication from the information transmitting terminal 1 and transmits it to the information receiving terminals 3. The position information detecting device 4 detects the position of the information transmitting terminal 1 and each of the information terminals 3 and transmits position information to the transaction brokerage apparatus 2.

The position information detecting device 4 may be provided in the information transmitting terminal 1 and each of the information receiving terminals 3. For example, they may include the well known capability of detecting GPS signals to know their positions (GPS detection capability). The transaction brokerage apparatus 2 may also include a position information detecting device 4. When the transaction brokerage apparatus 2 is provided in a relay station of a portable telephone, for example, the transaction brokerage apparatus 2 can include a position information detecting device 4.

As shown in FIG. 1, The transaction brokerage apparatus 2 includes a transaction transmission and reception unit 21, a transaction management unit 22, a transaction information recording unit 23, a recipient selecting unit 24, and a position information detecting unit 25. The transaction brokerage apparatus 2 further includes a transaction log file 26 and a terminal registration database (DB) 27.

The transaction transmission and reception unit 21 transmits and receives data to and from the information transmitting terminal 1 and the information receiving terminals 3 under the control of the transaction management unit 22. The transaction management unit 22 manages transaction brokerage processing and manages exchange of various kinds of data, which are transmitted and received at the transaction transmission and reception unit 21, between the information transmitting terminal 1 and information receiving terminals 3 based on their expiration times. The transaction information recording unit 23 records transaction logs in the transaction log file 26. Transaction log file 26 stores transaction logs (transaction log information). The recipient selecting unit 24 obtains the position of the information transmitting terminal 1 and each of the information receiving terminals 3, both of which are registered in the terminal registration DB 27, from the position information detecting unit 25, and selects one or more of the information receiving terminals 3 based on the position information. The terminal registration DB 27 registers in advance one or more information receiving terminals 3 which want receive information from the information transmitting terminal 1, together with their profile information (individual information) of the terminals 3. The position information detecting unit 25 detects information of positions of the information transmitting terminal 1 and the information receiving terminals 3.

When receiving a transaction request from the information transmitting terminal 1, the transaction management unit 22 requests the recipient selecting unit 24 to select one or more information receiving terminals 3. The transaction management unit 22 transmits the transaction request to one or more information receiving terminals 3 selected by the recipient selecting unit 24.

The recipient selecting unit 24 selects one or more information receiving terminals 3 which match the transaction request (conditions for receiving the transaction request, which will be described later) from among the plurality of information receiving terminals 3 registered in the terminal registration DB 27. For this purpose, individual information in the terminal registration DB 27 is used. When no conditions for receiving the transaction request are defined, all of the registered information receiving terminals 3 are selected.

FIG. 3 shows an example of individual information in the terminal registration DB 27. The individual information of the information receiving terminal 3 includes user names, personal information, profile information (or attribute information), and receiving denial flag (and their expiration time). The personal information may includes a telephone number, e-mail address, and street address or the like, for example. The profile information may includes age, sex, hobby, time information, and position information or the like. The time information indicates the time at which the position information was obtained. The position information is obtained through the position information detecting unit 25. The position information and the associated time information are updated each time new position information is obtained. The receiving denial flag will be described later. Similarly, individual information of the information transmitting terminal 1 is also stored. Items of individual information of the information transmitting terminal 1 may or may not be the same as those of the individual information of information receiving terminals 3. A receiving denial flag is not provided for the information transmitting terminal 1.

When a condition for receiving a transaction request is "females at their twenties," the recipient selecting unit 24 selects information receiving terminals 3 which have profile information indicating which they are females at their twenties in the terminal registration DB 27. The recipient selecting unit 24 refers to profile information of information receiving terminals 3 which have transmitted transaction acceptances, which will be described later, and discards transaction acceptances transmitted from information receiving terminals 3 which do not match conditions for receiving the transaction request.

Then, the recipient selecting unit 24 selects information receiving terminals 3 which are within a specified distance (within a physically short distance) from the information transmitting terminal 1 among the information receiving terminals 3 selected based on the profile information. For this purpose, the recipient selecting unit 24 obtains position information of the information transmitting terminal 1 and information receiving terminals 3 from the position information detecting unit 25. The selection finally determines the information receiving terminals 3 to which the transaction request is to be transmitted. Whether or not an information receiving terminal 3 is within the "predetermined range" may be registered beforehand in the terminal registration DB 27 as individual information of the information transmitting terminal 1, or may be specified in conditions for receiving a transaction request as required. In particular, the "predetermined range" is specified in terms of distance value.

The transaction management unit 22 regards transaction acceptances received from information receiving terminals 3 within expiration time of the transaction request as being valid based on the expiration time (which will be described later) set in the transaction request, and transmits only those transaction acceptances to the information transmitting terminal 1. The transaction management unit 22 also regards as valid only transaction possible/impossible indications received from the information transmitting terminal 1 within expiration time of the transaction acceptance based on the expiration time (which will be described later) set in the transaction acceptance, and transmits only those indications to the information receiving terminals 3. After transmitting a transaction request to information receiving terminals 3, the transaction management unit 22 becomes waiting state for reception of a transaction acceptance (a response to the transaction request). After transmitting the transaction acceptance to the information transmitting terminal 1, the transaction management unit 22 also becomes waiting state for reception of a transaction possible/impossible indication (response to a transaction acceptance). When the expiration time of the transaction request has expired, the transaction management unit 22 stops waiting process for the reception. When no transaction acceptance is returned for the transaction request, the transaction management unit 22 regards the transaction request as being invalid and notifies the information transmitting terminal 1 that the transaction has become void. Also, the transaction management unit 22 transmits a transaction void notification to an information receiving terminal 3 which transmitted the transaction acceptance which was received after the expiration time of the transaction request expired. The same applies to the case where the expiration time of the transaction acceptance has expired.

Alternatively, during a transaction acceptance wait period, new information receiving terminals 3 may be selected in the same manner described earlier at regular time intervals, and the transaction request may be transmitted to them. In this case, when an upper limit (which will be described later) is set on the number of information terminals 3 to which a transaction request is transmitted and when the upper limit is reached, the transaction request is not transmitted to additional information receiving terminals 3. When such upper limit is not set, an upper limit may be placed on the number of transaction acceptances to receive from information receiving terminals 3.

Figure 2:
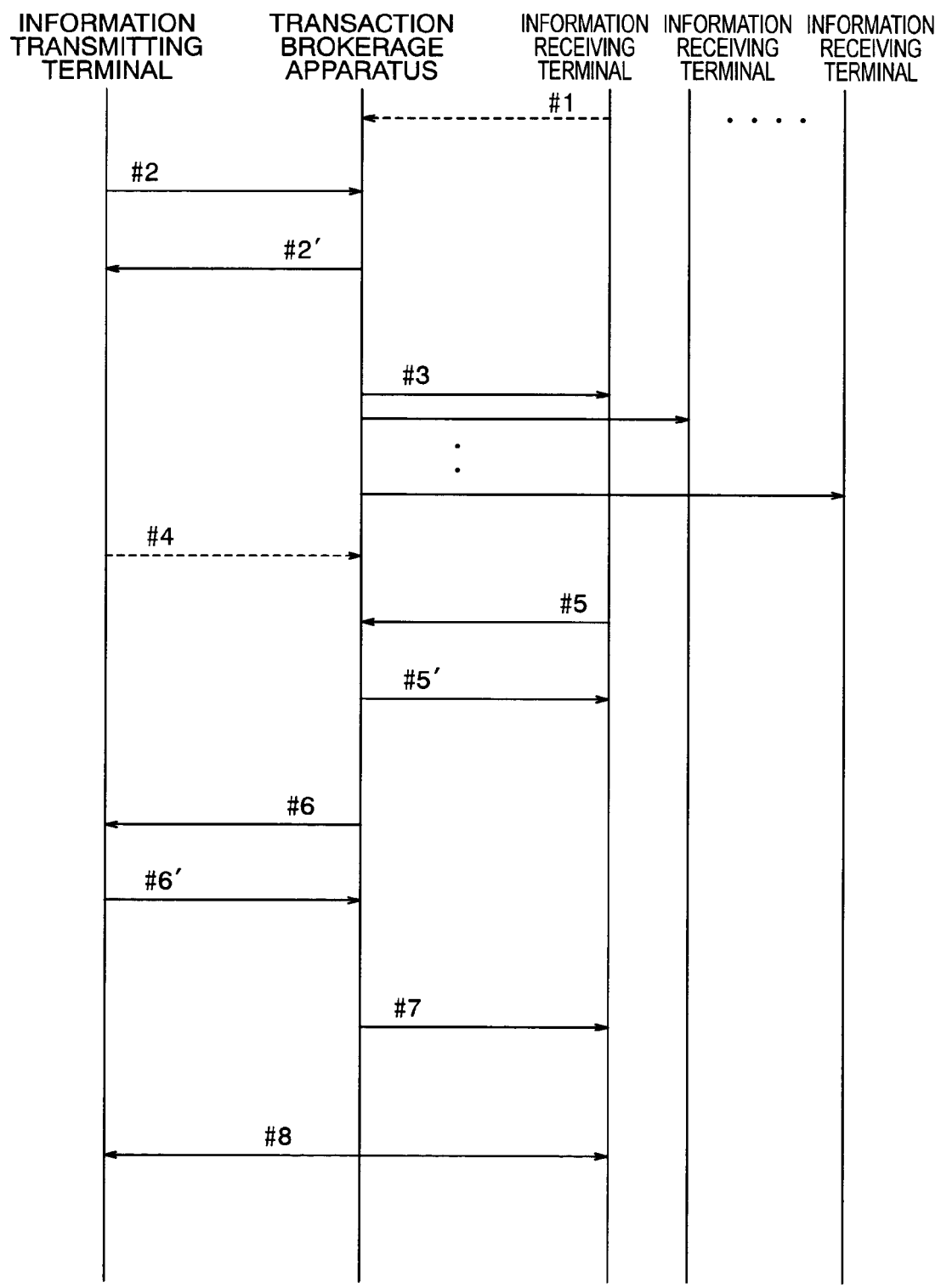
FIG. 2 is a diagram schematically showing an outline of a transaction brokerage process of a transaction brokerage method according to the present invention.

FIG. 2 shows an outline of a transaction brokerage process in a transaction brokerage method performed in the transaction brokerage system shown in FIG. 1.

Information receiving terminals 3 transmit a receiving denial indication (and its expiration times) to the transaction brokerage apparatus 2 (process #1). As indicated by the dashed line in FIG. 2, the transmission of the receiving denial indication is discretion of the information receiving terminals 3. The information receiving terminals 3 can transmit the receiving denial indication at any time regardless of whether during transaction request processing or not. As shown in FIG. 3, when the transaction management unit 22 receives the receiving denial indication, the transaction management unit 22 request the recipient selecting unit 24 to set a receiving denial flag and its expiration time in the terminal registration DB 27. The recipient selecting unit 24 periodically checks the terminal registration DB 27 and clears receiving denial flags which expires their expiration time. The recipient selecting unit 24 does not select information receiving terminals 3 for which the receiving denial flag is set as recipients of the transaction request. Consequently, the transaction request is transmitted to such information receiving terminals 3.

As indicated in a box drawn by dashed line in FIG. 3, conditions for receiving denial may be added to receiving denial flags, when required. Receiving denial conditions may set condition for an information transmitting terminal 1 from which an information receiving terminal 3 does not want to receive information. For example, a receiving denial indication may be set against an information transmitting terminal 1 from which only transaction requests of no interest are transmitted. The recipient selecting unit 24 does not select information receiving terminals 3 for which a receiving denial flag is set as recipients of the transaction request transmitted from information terminals 1 which met a receiving denial condition, within expiration time of the receiving denial flag.

The information transmission terminal 1 transmits transaction request data (hereinafter referred to as first transaction request data) to the transaction brokerage apparatus (process #2). FIG. 4A shows an example of the first transaction request data. The first transaction request data includes information of information transmitting terminal, the description of the transaction, a transaction expiration time, a condition for receiving the transaction request, permission for disclosure of individual information, a request for disclosure of individual information, a request for individual information disclosure as prerequisite, and the upper limit of number of information receiving terminals. The items in a box drawn by dashed line in FIG. 4A are essential items in the first transaction request data. The information transmitting terminal 1 which transmits the first transaction request data must provides at least the essential items. Items outside the box drawn by dashed line are optional items. Optional items are added (inputted) by the information transmitting terminal 1 which transmits the first transaction request data, when required. The same applies to the data shown in FIGS. 4B to 4E.

The "information of information transmitting terminal" indicates that information transmitting terminal 1 has transmitted the first transmission request data. The "description of the transaction request" describes contents of the transaction. The "transaction expiration time" indicates the time at which the first transaction request data is no longer valid (the data is valid until that time). The "condition for receiving transaction request" represents a condition for specifying information receiving terminals 3 (or the users) to which the information transmitting terminal 1 wants to transmit the transaction request. The "permission for disclosure of individual information" indicates that the information transmitting terminal 1 permits disclosure of its individual information to the information receiving terminals 3. The "request for disclosure of individual information" indicates that the information transmission terminal 1 requests for disclosure of individual information of the information receiving terminals 3. The "request for disclosure of individual information as prerequisite" indicates that the information transmitting terminal 1 does not perform the transaction with an information receiving terminal 3 unless the information receiving terminal 3 discloses its individual information. The "upper limit of the number of information receiving terminals" indicates the upper limits of the number of information receiving terminals 3 which can be selected as the recipients of the transaction requests.

By adding the expiration time of the transaction request to the transaction request, the information transmitting terminal 1 can specify the time until when transaction brokerage is valid, namely, how long the information transmitting terminal 1 waits until the transaction is settled. For example, when the transaction is of urgency, the time may be set to a value close to the current time, otherwise, the time may be set to a value far from the current time. Depending on this information, the transaction brokerage apparatus 2 selects information receiving terminals 3 which meet the condition for receiving the transaction request (or receiving terminals 3 which are within a predetermined range from the information transmitting terminal 1, for example) at regular intervals, and delivers the transaction request to them, within the expiration time of the transaction request. Consequently, the information transmitting terminal 1 can be prevented from waiting infinitely for a transaction acceptance for some reason.

By adding a condition for receiving the transaction request to the transaction request, the information transmitting terminal 1 can specify condition of information receiving terminals 3 to which the information transmitting terminal 1 transmits the transaction request. For example, the information transmitting terminal 1 can specify information receiving terminals 3 which are within a predetermined range from the information transmitting terminal 1 and meet the condition for receiving the transaction request. By adding permission for disclosure of individual information to the transaction request, the information transmitting terminal 1 can specify whether the information transmitting terminal 1 permits disclosure of its individual information. Depending on this information, the transaction brokerage apparatus 2 adds or deletes the individual information of the information transmitting terminal 1 to or from second transaction request data (which will be described later), when the second transaction request data is delivered to the information receiving terminals 3. By adding a individual information disclosure request to the transaction request, the information transmitting terminal 1 can specify whether or not the terminal 1 requests the information receiving terminals 3 to disclose their individual information. Depending on this information, the transaction brokerage apparatus 2 requests the information receiving terminal 3 to disclose their individual information when the apparatus 2 delivers the second transaction request data to the terminal 3.

By adding a "request for disclosure of individual information as prerequisite" of the information receiving terminals 3 to the transaction request, the information transmitting terminal 1 can specify that disclosure of individual information of the information receiving terminals 3 is an essential condition of the settlement of the transaction. Depending on this information, when the transaction brokerage apparatus 2 transmits the second transaction request data to the information receiving terminal 3, firstly the transaction brokerage apparatus 2 transmits a "request for disclosure of individual information as prerequisite" to the information receiving terminals 3. Then, only when the individual information is disclosed in transaction acceptances from information receiving terminals 3, the transaction brokerage apparatus 2 transmits those transaction acceptances to the information transmitting terminal 1.

Adding various conditions concerning disclosure of individual information in this way can control whether or not individual information is disclosed before the settlement of a transaction. That is, unless "permission for disclosure of individual information" is added to the transaction request, the transaction brokerage apparatus 2 does not disclose the individual information of the information transmitting terminal 1 to the information receiving terminals 3 until the transaction is settled (until the completion of process #7 in FIG. 2). Furthermore, unless a "request for disclosure of individual information as prerequisite" is added to the transaction request, the transaction brokerage apparatus 2 does not discloses the individual information of the information receiving terminals 3 to the information transmitting terminal 1 until the transaction is settled.

By adding the upper limit of the number of information receiving terminals 3 to the transaction request, the information transmitting terminal 1 can specify that the terminal 1 performs the transaction with a smaller number of information receiving terminals 3 than the limit. Depending on this information, the transaction brokerage apparatus 2 does not transmit the transaction request to a number of information receiving terminals 3 greater than or equal to the upper limit. And, when the transaction brokerage apparatus 2 receives a greater number of transaction acceptances from information receiving terminals 3 than the upper limit, the transaction brokerage apparatus 2 discards transaction acceptances it subsequently receives. Due to this processing, the transaction request is not delivered to all the information receiving terminals 3 registered in the terminal registration DB 27, but can be delivered to limited information receiving terminals 3 in consideration of position information as will be described below. Consequently, processes and operations in the information transmitting terminal 1 can be simplified.

The transaction brokerage apparatus 2 which receives the first transaction request data assigns a transaction ID to the first transaction request data, and transmits the assigned transaction ID back to the information transmitting terminal 1 (process #2'). The transaction brokerage apparatus 2 also generates second transaction request data based on the first transaction request data, and transmits it to a plurality of information receiving terminals 3 (process #3). After this the transaction brokerage apparatus 2 becomes the waiting state until the transaction expiration time expires as described earlier. FIG. 4B shows an example of second transaction request data. The second transaction request data includes a transaction ID, the description of the transaction request, transaction expiration time, individual information of the information transmitting terminal 1, a request for disclosure of individual information, and a request for disclosure of individual information as prerequisite.

The individual information of the information transmitting terminal 1 is added to the transaction request when the first transaction request data in FIG. 4A includes permission for disclosure of individual information. The individual information of the information transmitting terminal 1 is provided beforehand (not shown) in the transaction brokerage apparatus 2. The individual information may be transmitted from the information transmitting terminal 1 along with the first transaction request data. The "request for disclosure of individual information" and "request for disclosure of individual information as prerequisite" are added when the first transaction request data includes them.

The information transmitting terminal 1, which has transmitted the transaction request previously, transmits a transaction suspension request to the transaction brokerage apparatus 2 (process #4). Transmitting of the transaction suspension request is discretion of the information transmitting terminal 1, as shown by the dashed line in FIG. 2. The information transmitting terminal 1 can transmit a transaction suspension any time regardless of whether during transaction request processing or not. When receiving the transaction suspension request, the transaction management unit 22 performs a process for suspending the transaction. In particular, the transaction management unit 22 notifies each of the information receiving terminals 3 to which the transaction request has been transmitted previously, and allows them to stop waiting process for transaction (or eliminating the session described later). For this purpose, in the session, the transaction management unit 22 holds individual information of the information receiving terminals 3 which have transmitted a transaction request.

When accepting the transaction, an information receiving terminals 3 which has received the second transaction request data generates transaction acceptance data (hereinafter referred to as first transaction acceptance data), and transmits it to the transaction brokerage apparatus 2 (process #5). FIG. 4C shows an example of first transaction acceptance data. The first transaction acceptance data includes a transaction request ID, transaction acceptance expiration time, and permission for disclosure of individual information. The transaction expiration time indicates the time until which the transaction acceptance is valid. The permission for disclosure of individual information indicates that the information receiving terminal 3 permits its individual information to be disclosed to the information transmitting terminal 1. When a request for disclosure of individual information of the information receiving terminals 3 as prerequisite is provided, permission for disclosure of individual information of the information receiving terminal 3 is required for the transaction to begin. Therefore, when permission for disclosure of individual information is not given by the information receiving terminal 3, the transaction management unit 22 at this point notifies the information receiving terminal 3 that the transaction has become void.

By Adding the "expiration time" to the transaction acceptance, it is possible to avoid malicious behavior such as intentional postponement of notification of the transaction possible/impossible by the information transmitting terminal 1, and the accident that the information receiving terminal 3 infinitely waits a notification of the transaction possible/impossible for some reason. By adding "permission for disclosure of individual information" to the transaction acceptance, the information receiving terminal 3 can specify whether or not the terminal 3 permits disclosure of its own individual information. Depending on this information, when delivering second transaction acceptance data (described later) to the information transmitting terminal 1, the transaction brokerage apparatus 2 add or omit the individual information of the information receiving terminal 3 to or form the second transaction acceptance data. Unless permission for disclosure of individual information is added to the transaction acceptance, the transaction brokerage apparatus 2 does not disclose the individual information of the information receiving terminal 3 to the information transmitting terminal 1 until the transaction is settled.

The transaction brokerage apparatus 2, which received the first transaction acceptance data, assigns a transaction acceptance ID to the first transaction acceptance data and transmits the added transaction acceptance ID back to the information receiving terminal 3 which has transmitted the first transaction acceptance data (process #5'). The transaction brokerage apparatus 2 generates second transaction acceptance data based on the first transaction acceptance data and transmits it to the information transmitting apparatus 1 (process #6). After this, the transaction brokerage apparatus 2 becomes waiting state for receiving a transaction possible/impossible indication until the transaction acceptance expiration time expires, as described above. FIG. 4D shows an example of second transaction acceptance data. The second transaction acceptance data includes a transaction request ID, a transaction acceptance ID, transaction acceptance expiration time, and individual information of information receiving terminal.

The information receiving terminal 3, which has received the second transaction acceptance data, generates transaction possible/impossible data in accordance with the transaction acceptance and transmits it to the transaction brokerage apparatus 2 (process #6'). FIG. 4E shows an example of transaction possible/impossible data. The transaction possible/impossible data includes a transaction request ID, a transaction acceptance ID, and a transaction possible/impossible indication. The transaction possible/impossible indication is set to "possible" when the information receiving terminal 3 decided to conduct (or settle) the transaction or "impossible" when it decides not to conduct the transaction.

The transaction brokerage apparatus 2, which received the transaction possible/impossible data, transmits it to the information receiving terminal 3 (process #7), then a transaction success indication to the information transmitting terminal 1 and the information receiving terminal 3 (process #8). When the transaction is settled, after process #8, the transaction management unit 22 directs the recipient selecting unit 24 to retrieve individual information of the information transmitting unit 1 from the terminal registration DB and to provide it to the information receiving terminal 3, or, similarly, individual information of the information receiving terminal 3 to the information transmitting terminal 1, as required (or requested). In process #8, the transaction management unit 22 directs the transaction information recording unit 23 to records log information on the transaction in the transaction log file 26. The transaction log information includes information of the information transmitting terminal 1 which transmitted the transaction request, the information receiving terminal 3 which transmitted the transaction acceptance, and the transaction request ID, for example.

FIG. 5 shows a flow of transaction brokerage process performed in the transaction brokerage apparatus of the transaction brokerage system shown in FIG. 1.

The transaction transmission and reception unit 21 receives a transaction request (or transaction request data) shown in FIG. 4A from the information transmitting terminal 1 and provides it to the transaction management unit 22 (step S11). This corresponds to process #2 in FIG. 2. The transaction management unit 22 generates a session (or a thread) relating to the received transaction request data (step S12). That is, the transaction management unit 22 generates one session for one transaction request. In particular, the transaction management unit 22 activates one new session (or a process or thread) and performs a transaction request processing in the session at each time it receives a transaction request, in a reception waiting process until the expiration time of the transaction request expires. Therefore, even while processing one transaction request, the transaction management unit 22 can receive and handle another transaction request from another information receiving terminal 3. By generating a session for each transaction requests, multiple transaction requests are handled in parallel at the same time.

The transaction management unit 22 assigns a unique transaction ID (ID which identifies the session) to the transaction request in the session and directs the transaction transmission and reception unit 21 to transmits the transaction ID. In response to this direction, the transaction transmission and reception unit 21 transmits the transaction ID to the information transmitting terminal 1 (step S13). This step corresponds to process #2' in FIG. 2.

The transaction management unit 22 generates a transaction request (or transaction request data) shown in FIG. 4B based on the transaction request shown in FIG. 4A, and directs the transaction transmission and reception unit 21 to transmit the transaction request. In response to the direction, the transaction transmission and reception unit 21 transmits the transaction request to a plurality of information receiving terminals 3 (step S14). Then, various items of data are transmitted in a similar manner. Step S14 corresponds to process #3 in FIG. 2. Step S14 will be described later with reference to FIG. 6.

Each of the plurality of information receiving terminals 3 which received the transaction request transmits a transaction request shown in FIG. 4C to the transaction brokerage apparatus 2 when the information receiving terminal 3 wants to accept the transaction request. This corresponds to process #5 in FIG. 2. When receiving the transaction acceptance, the transaction transmission and reception unit 21 provides it to the transaction management unit 22. Then, various items of data are received in a similar manner.

After step S14, the session enters waiting state for receiving of a response and determines whether or not it is within the transaction expiration time (or the transaction expiration time has expired) at regular intervals (step S15). When the expiration time has not expired, the transaction management unit 22 in the session determines whether or not a response from an information receiving terminal 3 has been received (process #5 in FIG. 2) at the transaction transmission and reception unit 21 (step S16). When no response is received, step S15 and the subsequent steps are repeated. When a response is received, the transaction management unit 22 further determines whether the response represents a transaction acceptance or a transaction suspension request (step S17). When the response represents a transaction acceptance, the transaction management unit 22 performs a transaction acceptance process (step S18). This corresponds to processes #5' to #7 in FIG. 2. Step S18 will be described later with reference to FIG. 7. Then, the transaction management unit 22 ends the session relating to the received transaction request (step S19).

When the response represents a transaction suspension request at step S17, the transaction management unit 22 performs a transaction suspension process (step S110), transmits notification of the suspension of the transaction to the information receiving terminals 3 (step S111), and then performs step S19.

When the expiration time has expired at step S15, the transaction management unit 22 transmits notification that the transaction has failed to the information transmitting terminal 1, transmits notification of end of the transaction to the information receiving terminals 3 (step S112), and then the step S19 is performed.

FIG. 6 is a flowchart of a transaction request process and shows details of the transaction request delivery process at step S14 in FIG. 5.

The transaction management unit 22, which starts the transaction request delivery process, directs the position information detecting unit 25 to detect position of the information transmitting terminal 1. In response to this direction, the position information detecting unit 25 detects the position of the information transmitting terminal 1 and returns a result to the transaction management unit 22 (step S21).

In response to a direction from the transaction management unit 22, the recipient selecting unit 24 selects one of the information receiving terminals 3 in the terminal registration DB (step S22), and determines whether or not a receiving denial flag is set by the selected terminal 3 (step S23). When a receiving denial flag is not set, the recipient selecting unit 24 requests the position information detecting unit 25 to detect position of the selected information receiving terminal 3. In response to this, the position information detecting unit 25 detects the position of the information receiving terminal 3 and transmits a result back to the recipient selecting unit 24 (step S24). When the position of the information receiving terminal 3 which has obtained at step S24 is within a predetermined range from position of the information transmitting terminal 1 which has obtained at step S21, the recipient selecting unit 24 selects the information recipient terminal 3 (step S25).

Then, the recipient selecting terminal 24 determines whether or not the number of information receiving terminals 3 selected at step S25 does not exceed a predetermined upper limit (step S26). When the number does not exceeds the upper limit, step S22 and subsequent steps are repeated. When the number exceeds the upper limit, the recipient selecting unit 24 notifies a result of the selection to the transaction management unit 22. Based on the notification, the transaction management unit 22 transmits the transaction request to each of the selected information receiving terminals 3 through the transaction transmission and reception unit 21 (step S27). Step S27 actually corresponds to process #3 in FIG. 2.

Figure 7:
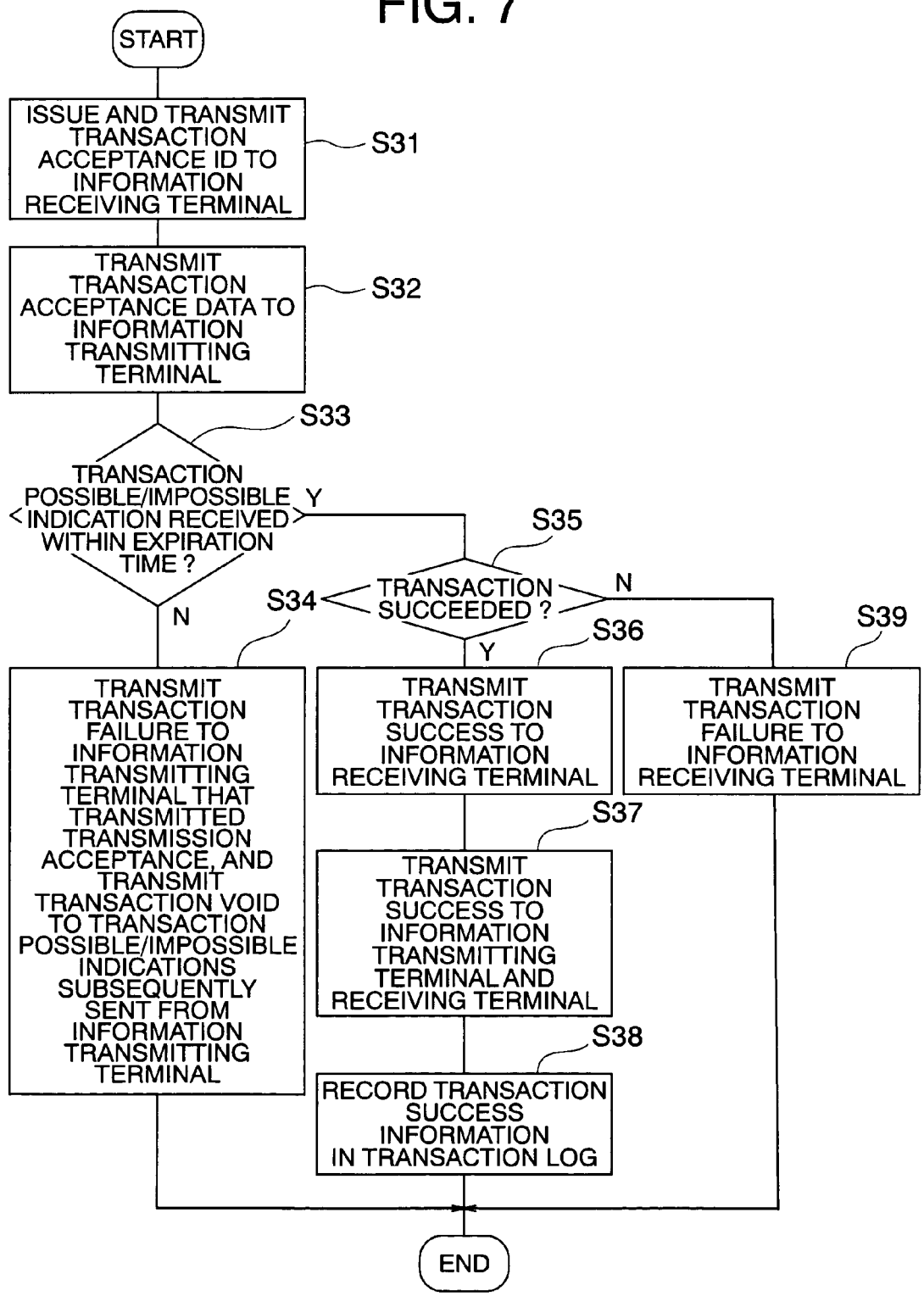

FIG. 7 is a transaction acceptance process flow and shows details of the transaction acceptance process performed at step S18 in FIG. 5.

The transaction management unit 22 issues a transaction acceptance ID and transmits it to the information receiving terminal 3 through the transaction transmission and reception unit 21 (step S31). This step corresponds to process #5' in FIG. 2. Then, the transaction management unit 22 generates a transaction acceptance (or transaction acceptance data) shown in FIG. 4D based on the transaction acceptance shown in FIG. 4C, and transmits the generated transaction acceptance to the information transmitting terminal 1 through the transaction transmission and reception unit 21 (step S32). This corresponds to process #6 in FIG. 2.

The information transmitting terminal 1, which receives the transaction acceptance, transmits a transaction possible/impossible indication (or transaction possible/impossible data) shown in FIG. 4E to the transaction brokerage apparatus 2, when the terminal 1 wants to settle the transaction corresponding to the received transaction acceptance. This corresponds to process #6' in FIG. 2.

After step S32, the session (or the transaction management unit 22) enters waiting state for receiving of a response, and the transaction management unit 22 determines whether or not a transaction possible/impossible indication has been received from the information transmitting terminal 1 through the information transmission and reception unit 21 after the expiration time of the transaction expires (step S33). When the transaction possible/impossible indication has not been received, the transaction management unit 22 transmits a transaction failure indication through the transaction transmission and reception unit 21 to the information transmitting terminal 1 which has transmitted the transaction acceptance, and further transmits a transaction void indication in response to transaction possible/impossible indications subsequently transmitted from the information transmitting terminal 1 (step S34).

When a transaction possible/impossible indication is received at step S33, the transaction management unit 22 further determines whether the transaction possible/impossible indication indicates success or failure (step S35). When it indicates that the transaction has succeeded, the transaction management unit 22 transmits the transaction possible/impossible indication to the information receiving terminal 3 through the transaction transmission and reception unit 21 (step S36). This corresponds to process #7 in FIG. 2. The transaction management unit 22 also transmits the transaction success indication to the information transmitting terminal 1 and the information receiving terminal 3 thorough the transaction transmission and reception unit 21 (step S37). This corresponds to process #8 in FIG. 2. Then, the transaction management unit 22 directs the transaction information recording unit 23 to record information of the transaction success (transaction success information) as a transaction log. In response to this direction, the transaction information recording unit 23 records the transaction log in the transaction log file 26 (step S38).

When the transaction possible/impossible indication indicates "impossible" at step S35, the transaction management unit 22 transmits the transaction failure indication to the information receiving terminal 3 through the transaction transmission and reception unit 21 (step S39).

Figure 8:
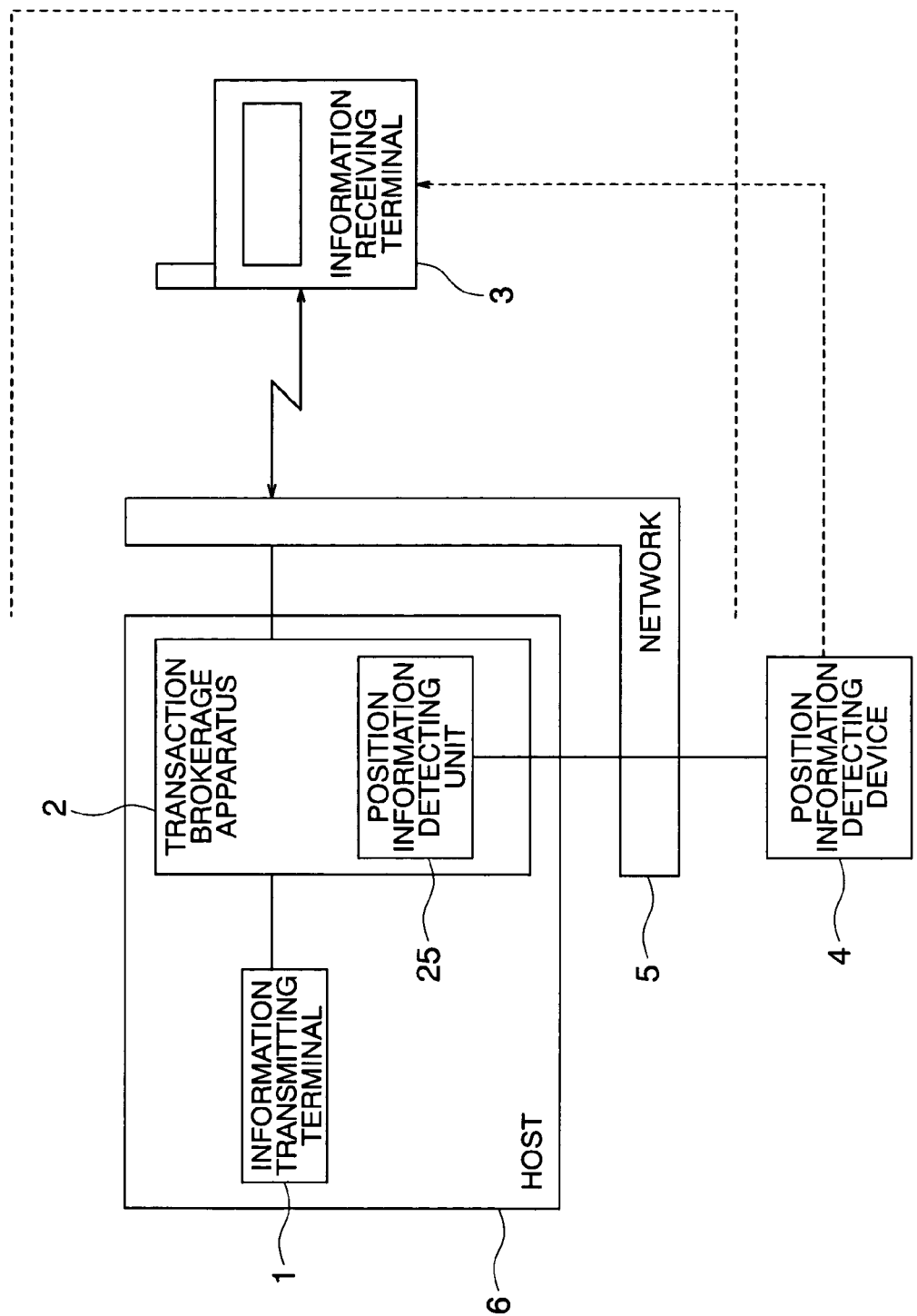
FIGS. 8 and 9 show examples of transaction brokerage by the transaction brokerage system.

FIG. 8 shows an example of transaction brokerage by the transaction brokerage system. In this example, a store such as a department store is an information transmitter and its customers are information receivers. For example, the department store mails (delivers) advertisements such as reduced-price time information or bargain sale information to targeted customers within a specified range from the department store.

In this example, an information transmitting terminal 1 is provided at the department store together with a transaction brokerage apparatus 2. That is, the information transmitting terminal 1 is provided as a terminal of a host computer (or server) 6, which is a transaction brokerage apparatus 2. Therefore, step S21 in FIG. 6 for detecting position of the information transmitting terminal 1 can be omitted. The information transmitting terminal 1 is connected with the transaction brokerage apparatus 2 via a local area network, for example. Thus, connection between them is not limited to wireless the connection. Information receiving terminals 3 may be internet-capable portable telephones carried by the customers. The information receiving terminals 3 are connected to a network 5 through wireless communication means which is well known and also connected to the transaction brokerage apparatus 2 through the Internet (not shown). Only one of the information receiving terminals 3 is shown in FIG. 8 (also in FIG. 9). A position detecting device 4 is provided by the telecommunication company, for example, which operates the network 5 in order to detect the position of information receiving terminals (portable telephones) 3. Alternatively, information receiving terminals 3 may include as a position detecting device 4 the well known capability of detecting GPS signals for detecting their position (GPS detection capability).

Customers, who want to receive advertisements of the store, register their individual information beforehand in a terminal registration DB 27 from their information receiving terminals 3 (or through other means such as the postal mail). The individual information is information which the customers permit to disclose. As described earlier, individual information of the customer includes profile information such as age, sex, and hobby, etc. and personal information such as telephone number and e-mail address, etc.

At the department store, the information transmitting terminal 1 transmits first transaction request data to the transaction brokerage apparatus 2. In the first transaction request data, the description of the transaction request may be "goods x are made available at a reduced price to first 100 customers who accept the transaction," the expiration time of the transaction request may be "within an hour (from the current time or transmission time)," and the conditions for receiving transaction request may be "the recipients are females at their twenties or thirties." Also, permission for disclosure of individual information of the department store is added. The individual information may be the name and street address of the department store, etc. Thus, the individual information of the department store can be disclosed before the settlement of the transaction and the credibility of the transaction can be enhanced. The upper limit of the number of the information receiving terminals 3 may be set to "100". However, the upper limit may be set to "200" in practice because all transactions received are not necessarily be settled.

The transaction brokerage apparatus 2 selects recipients (or the information receiving terminals 3) who are females at their twenties and thirties from the transaction registration DB 27 based on the conditions for receiving the transaction request. From among them, the transaction brokerage apparatus 2 selects information receiving terminals 3 within "the specified range" from the department store, and transmits the transaction request to them. In this example, information receiving terminals 3 within the specified range are selected by using communication means the coverage area of which is limited as indicated by the dashed line in FIG. 8. Since the information receiving terminals 3 are portable telephones, only the information receiving terminals 3 are selected whose transmission antennas are found within a range of 400 meters, for example, from the department store. Alternatively, the positions of the information transmitting terminal 1 and information receiving terminals 3 are detected and the information receiving terminals 3 which are within a predetermined range (for example 500 meters) are selected. Distance conditions of transaction request receivers may be added when the transaction request is transmitted from the information transmitting terminal 1.

When an information receiving terminal 3 (or its user), which received the transaction request, decides to accept the transaction, the information receiving terminal 3 set expiration time as "Within 5 minutes from now" and transmits a transaction acceptance to the transaction brokerage apparatus 2. The transaction brokerage apparatus 2 receives the transaction acceptance, and when the expiration time of the transaction request has not expired and the upper limits of the number of information receiving terminals has not been exceeded, transmits the transaction acceptance to the information transmitting terminal 1. When the information transmitting terminal 1 can conduct the transaction, the information transmitting terminal 1 transmits "transaction possible" set in the transaction possible/impossible indication to the transaction brokerage apparatus 2. When the expiration time of the transaction acceptance has not expired, the transaction brokerage apparatus 2 transmits the transaction possible/impossible indication to the information receiving terminal 3. At this point of time, the transaction is settled. When the information transmitting terminal 1 wants to close the transaction before the expiration time (for example, when a desired number of customers have been reached), the information transmitting terminal 1 transmits a transaction suspension indication to the transaction brokerage apparatus 2. In response to this, the transaction brokerage apparatus 2 notifies the information receiving terminals 3 that the transaction has been closed and discards further received transaction acceptances.

By transmitting through the transaction brokerage apparatus 2, customers can transmit and receive data for a transaction to and from the department store without disclosing their individual informations to the department store until the transaction is settled. After a transaction is settled, the transaction is conducted directly between the customer and department store. Therefore, the individual informations can be disclosed between the customer and department store to each other, when needed.

Figure 9:
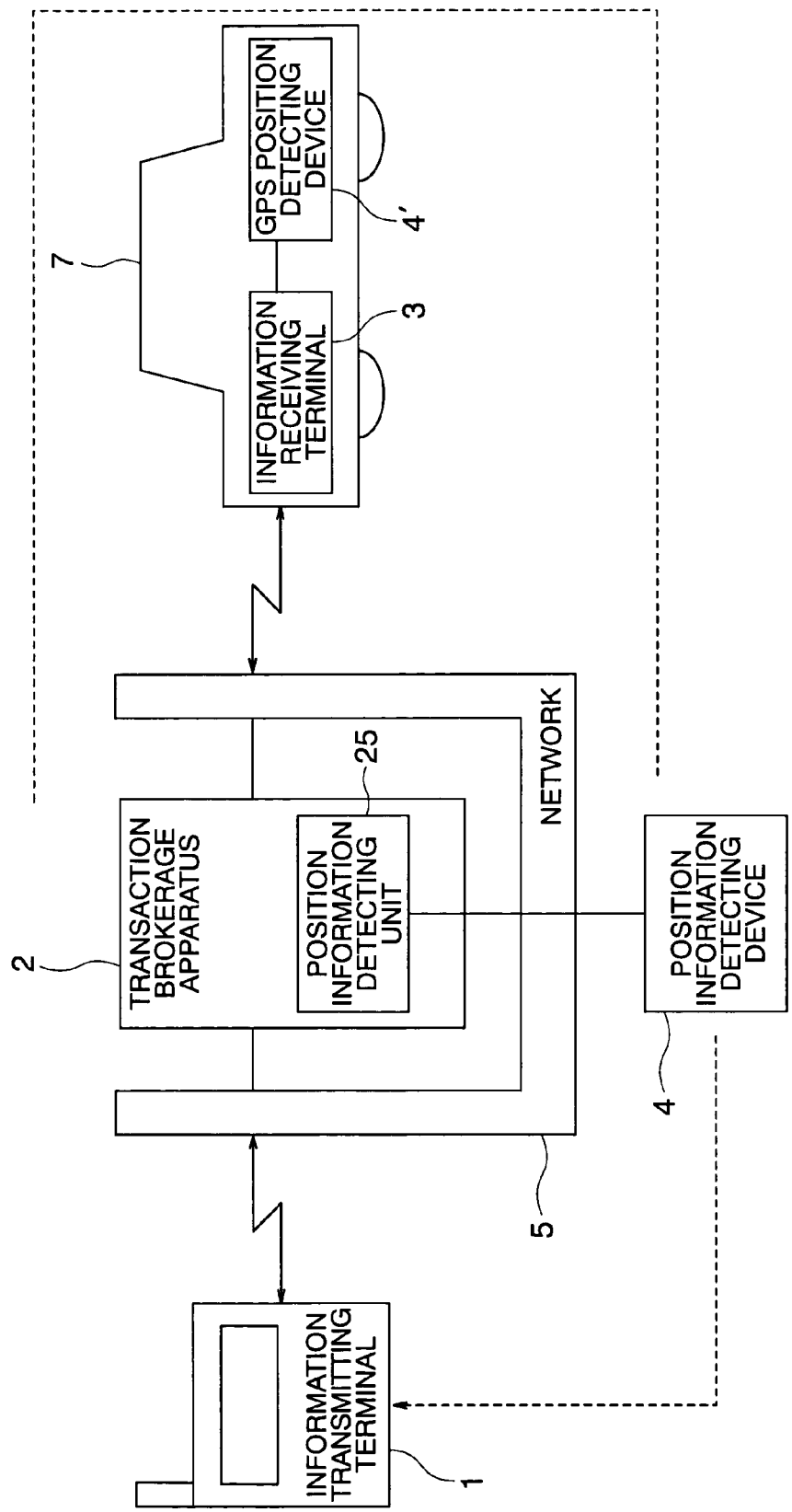

FIG. 9 shows an example of transaction brokerage performed by the transaction brokerage system. In this example, information transmitters are customers and an information receiver is a service provider, and one user contacts taxis within a given range in order to call a taxi in the shortest possible time.

In this example, an information receiving terminal 3 is provided in a mobile element 7 such as a taxi. Information transmitting terminals 1 and information receiving terminals 3 are internet-capable portable telephones. The information transmitting terminal 1 is carried by a customer, for example, and the information receiving terminals 3 are carried by the drivers of taxis 7. The information transmitting terminal 1 and information receiving terminals 3 are connected to a network 5 through well-known wireless communication means and connected to a transaction brokerage apparatus 2 through the Internet (not shown). The information receiving terminal 3 may be a personal computer, personal digital assistants, or mobile communication device which are internet-capable, for example. A position information detecting device 4 is provided by the telecommunication company which operates the network 5, for example, in order to detect position of information transmitting terminals (portable telephones) 1. The information receiving terminal 3 includes a GPS position detecting device 4', which is well known, for detecting GPS signals to detect position of the information receiving terminal 3, in place of the position information detecting device 4. The position of the information receiving terminal 3 is detected by the GPS position detecting device 4'. Alternatively, the position information detecting device 4 may also detect position of the information receiving terminal 3.

A taxi 7 which wants to receive a transaction request registers individual information of the taxi 7 in a terminal registration DB 27 beforehand through its own information receiving terminal 3. The individual information may include name of taxi company, fleet number, and capacity of the taxi.

A user of an information transmitting terminal 1, who would be a potential user of a taxi 7, transmits first transaction request data to the transaction brokerage apparatus 2. In the first transaction request data, the description of the transaction may be "Four-passenger taxi," and the expiration time of the transaction request may be "Within fifteen minutes from the current position (or within a radius of one kilometer of the current position)," for example. Also, a request for disclosure of individual information of the information receiving terminal 3 as prerequisite is added to the data. This allows the individual information of the taxi 7 having the information receiving terminal 3 to be disclosed to the user of the information transmitting terminal 1 before the transaction is settled. Therefore, the user can start the transaction with security.

The transaction brokerage apparatus 2 selects the information receiving terminals 3 of taxis 7 which are "four-passenger taxis" from the terminal registration DB 27 based on the conditions for receiving the transaction request, and from among them, further selects information receiving terminals 3 which are at positions "within 15 minutes" drive from the information transmitting terminal 1 of the passenger and transmits the transaction request to them. In this example, the transaction brokerage apparatus 2 (the recipient selecting unit 24) detects the distance between the information transmitting terminal 1 and the information receiving terminals 3, converts the distance into approximate driving time by an empirical method, and makes the selection. Only the information receiving terminals 3 within 15 minutes' drive to the information transmitting terminal 1 are selected as indicated by dashed line in FIG. 9. For example, since the information receiving terminals 3 are portable telephones, only the information receiving terminals 3 are selected whose transmission antennas are found within 15 minutes' drive from the position of the information transmitting terminal 1. Delivery of the transmission request may be limited beforehand to taxis 7 within "a radius of one kilometer."

When (the user of) an information receiving terminal 3 decides to accept the transaction, the terminal 3 sets the expiration time of the transaction acceptance to "within two minutes from now," for example, and transmits the transaction acceptance to the transaction brokerage apparatus 2. The transaction acceptance includes permission for disclosing individual information of the information receiving terminal 3. Without this permission, the transaction acceptance would be discarded. Then the transaction is settled in a manner similar to the example described earlier.

By transmitting through the transaction brokerage apparatus 2, the passenger can transmit a transaction request to empty taxis within a given range, rather than calling a taxi company to request to dispatch a taxi 7, so that the passenger can get a taxi 7 in the shortest possible time. The driver of a taxi 7 can conveniently receive within two minutes a response indicating whether the transaction is possible or not. Furthermore, the passenger can transmit and receive data for the transaction without disclosing his/her individual information to the driver of the taxi 7 until the transaction is settled, as described above.

As has been described, according to the transaction brokerage method and apparatus of the present invention, the user of an information transmitting terminal can select, as a party with whom the user conducts a transaction, the user of an information receiving terminal which is within a specified range from the information transmitting terminal and from which the information transmitting terminal can receive a transaction acceptance within an expiration time specified in the transaction request. Thus, a service or goods provider as the information transmitter can deliver information of services or goods which the provider provides in a physically limited area in a relatively short time period to target consumers selected effectively. A consumer as the information transmitter can select the service provider which can provide a service in the shortest possible time, namely, the service provider nearest to the consumer, and ask for the service.

Furthermore, the transaction brokerage program and the recording medium recording the program can realize the transaction brokerage method and apparatus described above readily. Thus, a service or goods provider as the information transmitter can readily deliver information of services or goods which the provider provides in a physically limited area in a relatively short time period to target consumers selected effectively. A consumer as the information transmitter can readily select the service provider which can provide a service in the shortest possible time, namely, the service provider nearest to the consumer, and ask for the service.

What is claimed is:

1. A transaction brokerage method for brokering a transaction between an information transmitting terminal and a plurality of information receiving terminals connected through a transaction brokerage apparatus, the method comprising:
   registering, at the transaction brokerage apparatus, the plurality of the information receiving terminals, and a position information and individual information of each of the plurality of the information receiving terminals;
   receiving a transaction request transmitted from the information transmitting terminal at the transaction brokerage apparatus, the transaction request including expiration time of the transaction request;
   selecting, at the transaction brokerage apparatus, one or more of the information receiving terminals registered which are within a predetermined range from the information transmitting terminal based on the registered position information as one or more recipients of the transaction request, and transmitting the transaction request to the selected one or more information receiving terminals from the transaction brokerage apparatus;
   receiving transaction acceptances from the selected information receiving terminals at the transaction brokerage apparatus;
   considering, at the transaction brokerage apparatus, one or more of the transaction acceptances which have been received within the expiration time included in the transaction request as valid transaction acceptances, and transmitting only the valid transaction acceptances from the transaction brokerage apparatus to the information transmitting terminal;
   receiving, at the transaction brokerage apparatus, at least a transaction possible indication from the information transmitting terminal;
   transmitting the received transaction possible indication from the transaction brokerage apparatus to the information receiving terminal indicated by the transaction possible indication; and
   transmitting registered individual information of the information receiving terminal indicated by the transaction possible indication from the transaction brokerage apparatus to the information terminal;
   wherein the transaction request includes an upper limit of the number of information receiving terminals, and wherein the transaction request is transmitted to a number of the information receiving terminals, the number being less than or equal to the upper limit included in the transaction request.

2. The transaction brokerage method according to claim 1, wherein the transaction acceptance includes expiration time of the transaction acceptance, and
   wherein one or more of the transaction possible or impossible indications which are received within the expiration time included in the transaction acceptance are regarded as valid transaction possible or impossible indications, and only the valid transaction possible or impossible indications are transmitted to the information receiving terminals.

3. The transaction brokerage method according to claim 1, wherein the transaction request includes a condition for receiving the transaction request,
   wherein the information receiving terminals are registered together with individual information of the information receiving terminals, and
   wherein information receiving terminals which meet the condition for receiving a transaction request included in the transaction request and are within a predetermined range from the information transmitting terminal are selected as the recipients.

4. The transaction brokerage method according to claim 1, wherein the transaction request includes a request to the information receiving terminal for disclosure of individual information of the information receiving terminal as a prerequisite; and
   wherein the transaction acceptances are transmitted to the information transmitting terminal only when the transaction acceptances includes permission for disclosure of the individual information of the information receiving terminals.

5. The transaction brokerage method according to claim 1, further comprising:
   receiving a receiving denial indication and expiration time of the receiving denial indication transmitted from the information receiving terminal; and
   excluding information receiving terminals which have transmitted the receiving denial indication from the recipients of the transaction request within the expiration time of the receiving denial indication.

6. The transaction brokerage method according to claim 1, further comprising:
   receiving a transaction suspension indication transmitted from the information transmitting terminal; and
   terminating processing of the transaction request transmitted from the information transmitting terminal which has transmitted the transaction suspension indication.

7. A transaction brokerage apparatus for brokering a transaction between an information transmitting terminal and information receiving terminal, the apparatus comprising:
   a transaction transmission and reception unit to receive a transaction request including expiration time of the transaction request and an upper limit of the number of information receiving terminals from the information transmitting terminal, transmit the transaction request to a number of the information receiving terminals, the number being less than or equal to the upper limit included in the transaction request, receive a transaction acceptance including expiration time of the transaction acceptance from the information receiving terminal, transmit the transaction acceptance to the information transmitting terminal, and receive a transaction possible indication from the information transmitting terminal;

a terminal registration database to register a plurality of the information receiving terminals and individual information of the information receiving terminals;

a position information detecting unit to obtain position information of the information transmitting terminals and information receiving terminals;

a recipient selection unit to select one or more of the information receiving terminals registered in the terminal registration database as one or more of recipient of the transaction request, and select one or more of the selected information receiving terminals based on the position information of the information transmitting terminal and information receiving terminals; and a transaction management unit to control the transaction transmission and receiving unit to transmit the transaction request to the information receiving terminals selected by the recipient selecting unit, regard transaction acceptances received within the expiration time of the transaction request as valid transaction acceptances, transmit only the valid transaction acceptances to the information transmitting terminal, regard transaction possible indications received within the expiration time of the transaction acceptance as valid transaction possible indications, and transmit only individual information of the information receiving terminals indicated by the valid transaction possible indications to the transaction information receiving terminals.

8. A computer-readable program recording medium recording a transaction brokerage program for realizing a transaction brokerage apparatus for brokering a transaction between an information transmitting terminal and a plurality of information receiving-terminal terminals, wherein the program causes the computer to execute:

registering, at the transaction brokerage apparatus, the plurality of the information receiving terminals, and a position information and individual information of each of the plurality of the information receiving terminals;

receiving a transaction request transmitted from the information transmitting terminal at the transaction brokerage apparatus, the transaction request including expiration time of the transaction request;

selecting, at the transaction brokerage apparatus, one or more of the information receiving terminals registered which are within a predetermined range from the information transmitting terminal based on the registered position information as one or more recipients of the transaction request, and transmitting the transaction request to the selected one or more information receiving terminals from the transaction brokerage apparatus;

receiving transaction acceptances from the selected information receiving terminals at the transaction brokerage apparatus;

considering, at the transaction brokerage apparatus, one or more of the transaction acceptances which have been received within the expiration time included in the transaction request as valid transaction acceptances, and transmitting only the valid transaction acceptances from the transaction brokerage apparatus to the information transmitting terminal;

receiving, at the transaction brokerage apparatus, at least a transaction possible indication from the information transmitting terminal;

transmitting the received transaction possible indication from the transaction brokerage apparatus to the information receiving terminal indicated by the transaction possible indication; and transmitting registered individual information of the information receiving terminal indicated by the transaction possible indication from the transaction brokerage apparatus to the information terminal;

wherein the transaction request includes an upper limit of the number of information receiving terminals, and wherein the transaction request is transmitted to a number of the information receiving terminals, the number being less than or equal to the upper limit included in the transaction request.

* * * * *